United States Patent
Gregg, III et al.

(10) Patent No.: US 6,592,072 B1
(45) Date of Patent: Jul. 15, 2003

(54) SPANWISE TAILORING OF DIVERGENT TRAILING EDGE WINGS

(75) Inventors: Robert D. Gregg, III, Fullerton, CA (US); John Charles Vassberg, Long Beach, CA (US); David M. Pitera, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/175,623

(22) Filed: Jun. 20, 2002

(51) Int. Cl.⁷ .................................. B64C 3/00
(52) U.S. Cl. .................. 244/35 R; 244/198; 244/215
(58) Field of Search .................. 244/35 R, 198, 244/215

(56) References Cited

U.S. PATENT DOCUMENTS

| | | | |
|---|---|---|---|
| 4,858,852 A | 8/1989 | Henne et al. | 244/35 R |
| 4,867,396 A | 9/1989 | Wainfan | 244/215 |
| 5,088,665 A * | 2/1992 | Vijgen et al. | 244/198 |
| 5,226,618 A | 7/1993 | Greenhalgh | 244/213 |
| 5,265,830 A * | 11/1993 | Allen | 244/130 |
| 5,318,249 A | 6/1994 | Stoner | 244/35 R |
| 5,342,004 A | 8/1994 | Bobbitt | 244/212 |
| 6,382,561 B1 * | 5/2002 | Brink | 244/215 |

* cited by examiner

Primary Examiner—J. Woodrow Eldred
(74) Attorney, Agent, or Firm—Harness Dickey & Pierce P.L.C.

(57) ABSTRACT

A method for forming a transonic wing that segregates a baseline transonic wing into a plurality of airfoil segments that are collectively modified an optimized so as to tailor a spanwise variation of the baseline transonic wing in a manner that includes the optimized airfoil segments. An improved wing is also provided.

25 Claims, 5 Drawing Sheets

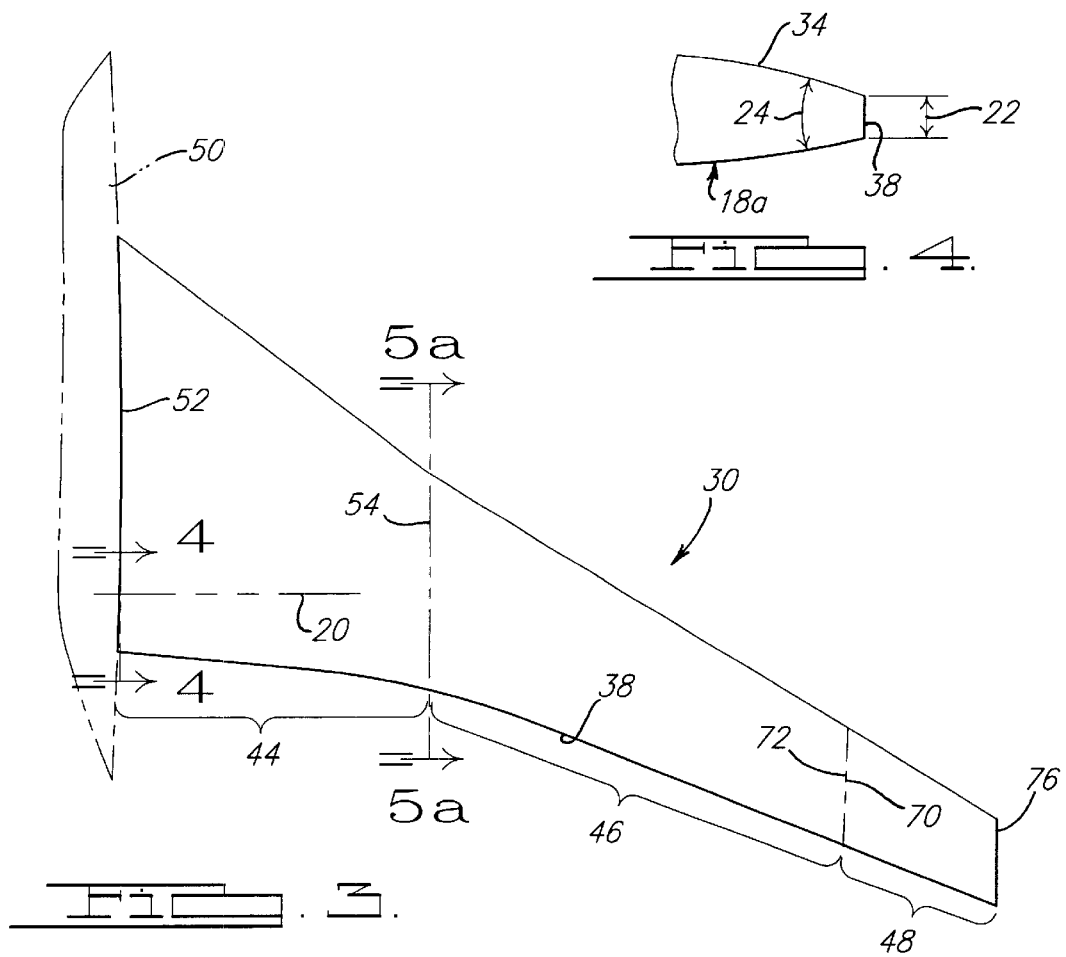
FIG. 3.
FIG. 4.
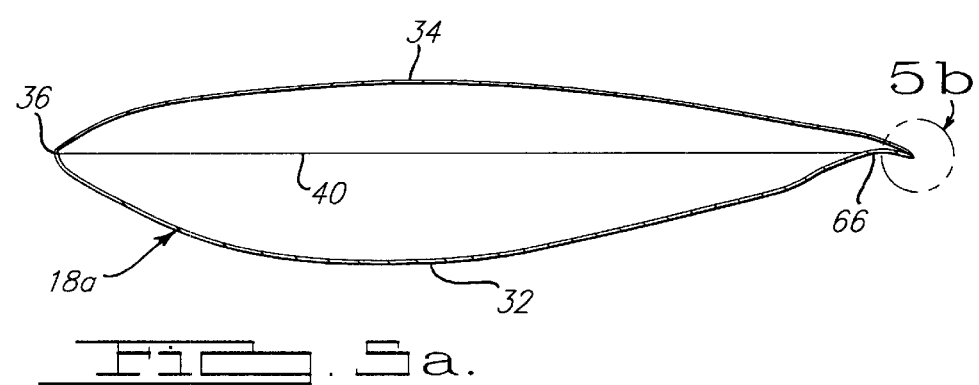
FIG. 5a.
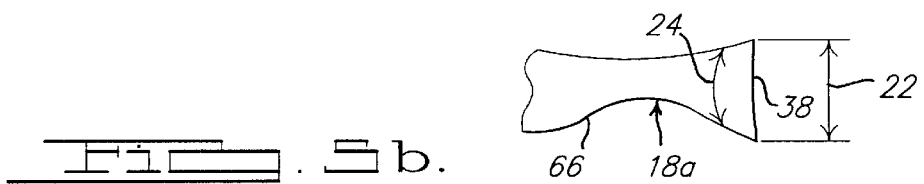
FIG. 5b.

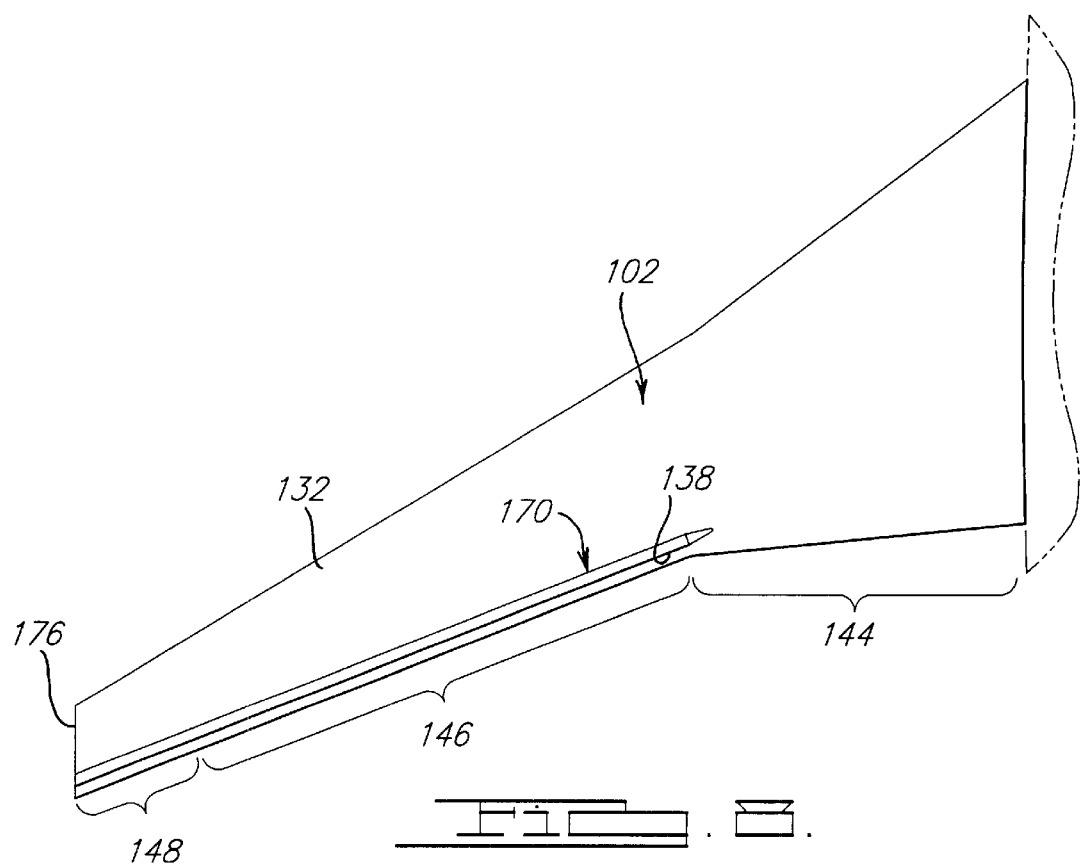

SPANWISE TAILORING OF DIVERGENT TRAILING EDGE WINGS

CROSS-REFERENCE TO RELATED APPLICATIONS

Other features of the present invention are discussed and claimed in commonly assigned copending U.S. Application Ser. No. 10/175,612 entitled Spanwise Tailoring of a Trailing Edge Wedge to a Wing.

FIELD OF THE INVENTION

The present invention generally relates to transonic wings for flight vehicles and more particularly to a wing trailing edge yielding an improved ML/D ratio.

BACKGROUND OF THE INVENTION

The aerodynamic drag of modern transonic wings consists of three components: lift-induced drag, profile drag and compressibility drag. Profile drag includes skin friction related drag and base drag due to trailing-edge bluntness. At relatively slower speeds (Mach numbers below the design condition), the wing drag consists of the lift-induced drag and profile drag. As the speed is increased, shock waves appear on the wing surface. These shock waves cause increased drag and are the major portion of the drag that was referred to above as compressibility drag. Compressibility drag increases dramatically with increasing speed and strongly limits the efficiency of a wing in terms of its lift-to-drag ratio. For example, modern air transport wing designs are developed to delay the onset of this drag rise until a point that is above a cruise design speed condition. The aerodynamics engineer utilizes both wing sweep and airfoil section characteristics as the primary variables in achieving a design that sufficiently delays the onset of compressibility drag while also attaining high lift and low drag.

Another consideration for the aerodynamics engineer related to the design of an efficient aircraft is trim drag. Trim drag is the drag associated with balancing the lifting forces with the center of gravity of the flight vehicle. Wings in general have a nose-down pitching moment caused by the distribution of lift, both chordwise and spanwise, over typical operating conditions.

One approach for obtaining a wing with an improved airfoil design is set forth in U.S. Pat. No. 4,858,852 to Henne et al. entitled "Divergent Trailing Edge Airfoil", which is incorporated by reference as if fully set forth herein. The methodology set forth in the '852 patent evaluates the airfoil design in two dimensions (i.e., in a cross-section taken generally perpendicular the longitudinal axis 20 of the wing). Applying the result to the entire span of the wing (i.e., the distance between the centerline of the fuselage of the aircraft and the distal end of the wing) can yield some improvement in the efficiency of wings, but further improvements are possible.

In this regard, we have noted that the application of a "continuous" divergent trailing edge to a wing may unnecessarily increase the base drag, and the pitching moment of the wing. Accordingly, there remains a need in the art for an improved application of the '852 patent across the wing trailing edge.

SUMMARY OF THE INVENTION

In one preferred form, the present invention provides an improved transonic wing having an inboard wing portion and a mid-span wing portion that is coupled to a distal end of the inboard wing portion. Each of the inboard wing portion and the mid-span wing portion includes a trailing edge base, a high pressure surface connected to the trailing edge base, a low pressure surface opposite the high pressure surface and connected to the trailing edge base and a leading edge connecting the high pressure and low pressure surfaces opposite the trailing edge base. The inboard wing portion is configured such that at least a portion of a trailing portion of the high pressure and low pressure surfaces are defined by slopes forming an included trailing edge angle that converges. The mid-span wing portion is configured such that a trailing portion of the high pressure and low pressure surfaces have slopes that form an included trailing edge angle that diverges. Preferably, the outboard wing portion is configured such that at least a portion of a trailing portion of the high pressure and low pressure surfaces are defined by slopes forming an included trailing edge angle that diverges but to a lesser degree than the mid-span wing.

In another preferred form, the present invention provides a method for forming a transonic wing having a chord and a span. The method includes the steps of: a) providing a baseline transonic wing; b) segregating the baseline transonic airfoil into a plurality of airfoil segments, each of the airfoil segments being defined by a set of characteristics including trailing edge bluntness and trailing edge included angle; c) modifying at least one of the characteristics in the set of characteristics for at least one airfoil segment to provide a modified portion of the wing; and d) tailoring a spanwise variation of the baseline transonic wing to include the plurality of most favorable airfoil segment configurations. Between step (c) and step (d), the methodology may further include the step of assessing an aerodynamic benefit to determine a plurality of most favorable airfoil segment configurations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 is a top plan view of a wing constructed in accordance with the teachings of the present invention;

FIG. 4 is an airfoil sectional view taken along the line 4—4 of FIG. 3;

FIG. 5 is an airfoil sectional view taken along the line 5—5 of FIG. 3;

FIG. 8 is a perspective view illustrating a wing assembly having a tailored divergent trailing edge constructed in accordance with the teaching of the present invention.

DETAILED DESCRIPTION OF THE PREFERRED EMBODIMENTS

Figure 1:
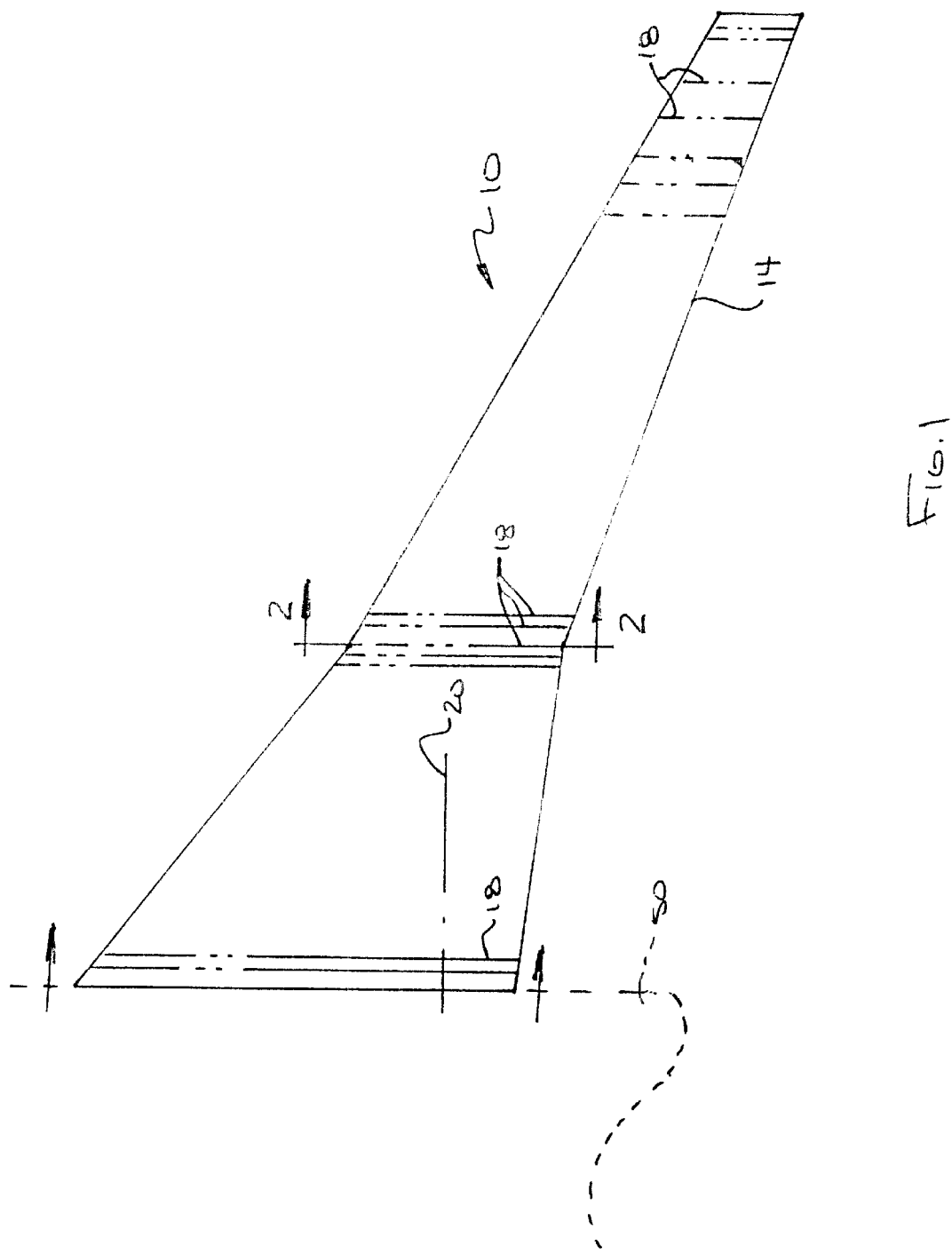
FIG. 1 is a top plan view of a wing that is being modified in accordance with the teachings of the present invention.
Figure 2:
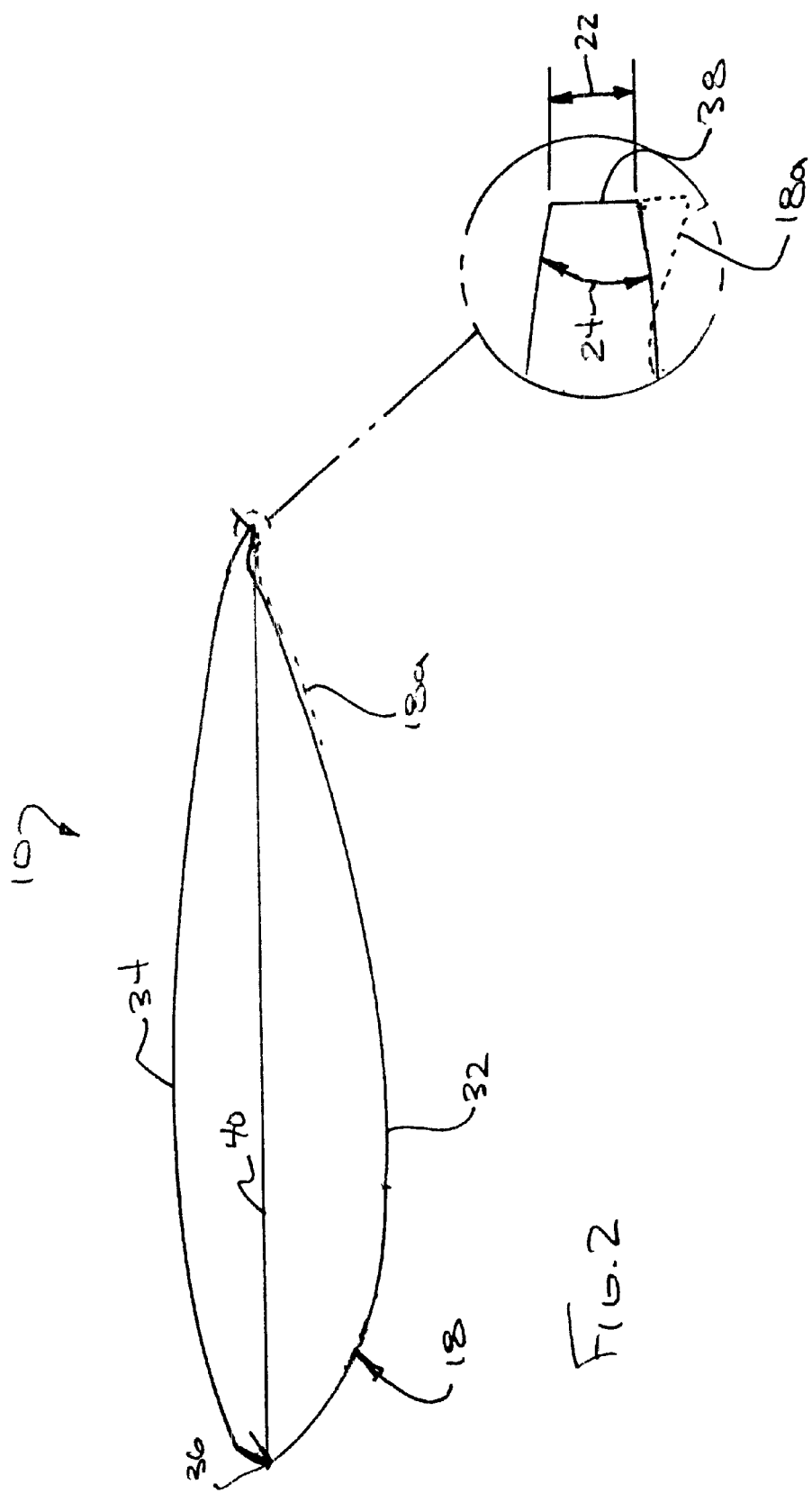
FIG. 2 is an airfoil sectional view taken along the line 2—2 of FIG. 1.

With reference to FIGS. 1 and 2 of the drawings, the basic approach to designing a wing with a trailing edge wedge in accordance with the teachings of the present invention is to start with a baseline wing 10. In the particular example provided, the baseline wing 10 has a conventional trailing edge 14. Those skilled in the art will appreciate, however, that the baseline wing 10 may be otherwise configured. For example, the baseline wing 10 may include a baseline trailing edge wedge 100 (FIG. 6) that extends, for example, over the entire span of the baseline wing 10.

The baseline wing 10 is divided into a plurality of airfoil segments 18 that are taken through the baseline wing 10 in a direction that is parallel to the direction of air flow across the baseline wing 10 (i.e., the airfoil segments 18 are taken in a direction that is generally perpendicular to the longitudinal axis 20 of the baseline wing 10). As those skilled in the art will appreciate, each airfoil segment 18 can be defined by a set of parameters that includes trailing edge bluntness 22 and trailing edge included angle 24.

The airfoil segments 18 need not be equally spaced apart across the span of the baseline wing 10, but should be positioned so as to permit various critical areas of the baseline wing 10 to be thoroughly analyzed. For example, a typical transonic wing will have the highest per area loading in a midspan region and as such, at least one airfoil segment 18, and preferably several airfoil segments 18, should be positioned in the areas of transition into and out of the midspan region. Analysis with modern computers and analytic tools such as a Navier-Stokes CFD calculation permit the baseline wing 10 to be segregated into a plurality of very closely spaced airfoil segments 18, which permits the aerodynamic engineer to evaluate the entire baseline wing 10 in terms of wave drag, profile drag, induced drag and trim drag, the resultant of which is typically expressed as MUD. Other characteristics could also or alternatively be assessed, including wing bending moments and/or buffet boundary.

With the baseline wing 10 segmented into the plurality of airfoil segments 18, modifications are next made to various parameters of the set of parameters for each airfoil segment 18, such as to the trailing edge bluntness 22 or the trailing edge included angle 24. Thereafter, the modified airfoil segment 18a is preferably analyzed to assess the aerodynamic benefit of the modifications. As noted above, the analysis may be performed analytically, or may be performed empirically as in a wind tunnel, a water tunnel or in actual flight. The steps of modifying the airfoil segment 18 and analyzing the modified airfoil segment 18a are repeated using different parameters until a most favorable airfoil segment configuration has been identified for each of the locations of the airfoil segments 18. Thereafter, the most favorable airfoil segment configurations are amalgamated to obtain an improved wing. It should be noted that modifications to any one airfoil segment 18 will likely effect the performance of adjacent airfoil segments 18 and as such, the optimization of any particular airfoil segment 18 cannot be performed on an independent basis.

The rationale for tailoring the spanwise variation of the airfoil segments is to more fully utilize concepts, such as a diverging trailing edge or a trailing edge wedge, in the areas where they provide a benefit and to omit them from areas where they provide little or no benefit. Design of a wing with this methodology provides an airfoil that is relatively more efficient.

EXAMPLE I
Spanwise Tailoring of a Divergent Trailing Edge to a Transonic Wing A systematic study of variations in the spanwise trailing edge bluntness 22 and the trailing edge included angle 24 was conducted to maximize the aerodynamic properties of the baseline wing 10 of FIGS. 1 and 2, and more specifically to improve transonic wave drag and maximize both range and fuel burn. Both the baseline wing 10 and the improved wing 30 (FIG. 3) can be generally described as including a high pressure surface 32, a low pressure surface 34 that is disposed opposite the high pressure surface 32, a leading edge 36 that connects the high pressure and low pressure surfaces 32 and 34 on a forward side, and a trailing edge base 38 that connects the high pressure and low pressure surfaces 32 and 34 on a rearward side that is opposite the leading edge 36. A chord 40 couples the leading edge 36 and the trailing edge base 38.

The improved wing 30 is illustrated to be segregated into three distinct zones: an inboard wing portion 44, a mid-span wing portion 46 and an outboard wing portion 48. The inboard wing portion 44 is configured to be coupled to an inboard side of a fuselage 50 and has a length of about 30% of the span of the improved wing 30. The inboard wing portion 44 is configured with a proximal end 52, which abuts the fuselage 50, and a distal end 54, which abuts the mid-span wing portion 46. As illustrated in FIG. 4, the proximal end 52 is configured such that the trailing edge base 38 has relatively small amount of trailing edge bluntness 22 (e.g., about 0.1% of the magnitude of the chord 40).

As illustrated in FIG. 5, the distal end 54 of the inboard wing portion 44 is configured such that the trailing edge base 38 has a relatively larger amount of trailing edge bluntness 22 (e.g., about 0.5% of the chord 40) and high pressure and low pressure surfaces 32 and 34 that are defined by diverging slopes in an area adjacent the blunt trailing edge base 38, which is illustrated to be generally perpendicular to the chord 40. In the particular embodiment illustrated, the diverging slopes of the high pressure and low pressure surfaces 32 and 34 define an included trailing edge angle 24 of about −15° and the high pressure surface 32 of the inboard wing portion 44 includes a region of high local concentrated concave curvature 66 immediately prior to the trailing edge base 38. The transition between the proximal and distal ends 52 and 54 proceeds in a tailored manner, which may or may not be uniform, but could also include discontinuous variations, too. Preferably, the trailing edge base 38 has a height that varies between about 0.1% of the chord 40 to about 1.0% of the chord 40 between the proximal and distal ends 52 and 54 of the inboard wing portion 44. Also preferably, the region of high local concave curvature 66 occurs within about the last 5% of the chord 40.

Returning to FIG. 3, the mid-span wing portion 46 is coupled to the distal end 54 of the inboard wing portion 44 and extends to a point that is located at about 80% of the span of the improved wing 30. In the particular embodiment provided, the configuration of the trailing edge base 38 and the high pressure surface (not specifically shown) of the mid-span wing portion 46 are uniform over the length of the mid-span wing portion 46 and are substantially identical to the configuration of distal end 54 of the inboard wing portion 44.

The outboard wing portion 48 is coupled at a proximal end 70 to the distal end 72 of the mid-span wing portion 46. The configuration of the trailing edge base 38 and the high pressure surface (not specifically shown) at the proximal end 70 of the outboard wing portion 48 are configured substantially identically to the configuration of the trailing edge base 38 and the high pressure surface (not specifically shown) at the distal end 72 of the mid-span wing portion 46. Both the trailing edge bluntness and the included trailing edge angle reduce at a uniform rate to about −10° and about 0.3% of the chord 40, respectively, at the tip 76 of the improved wing 30.

EXAMPLE II
Spanwise Tailoring of a Trailing Edge Wedge to a Wing

Figure 6:
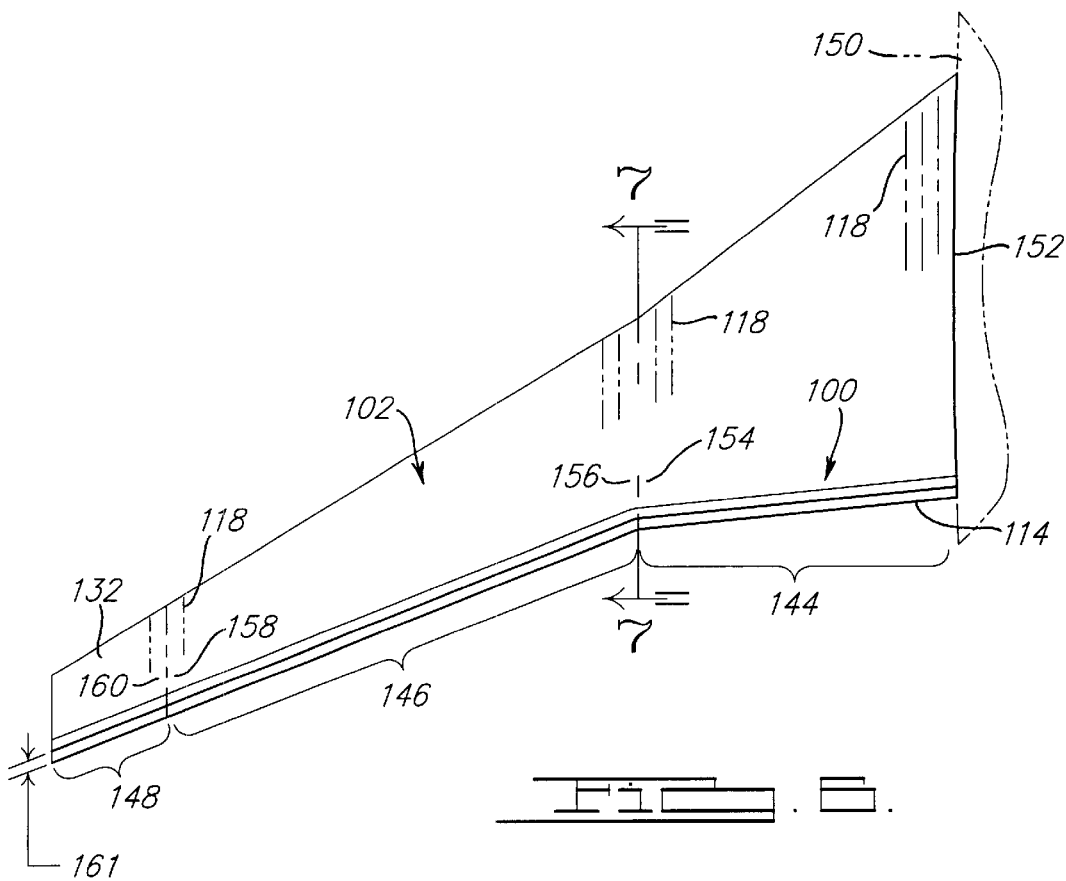
FIG. 6 is a bottom plan view illustrating a wing assembly that is being modified in accordance with the teachings of the present invention.
Figure 7:
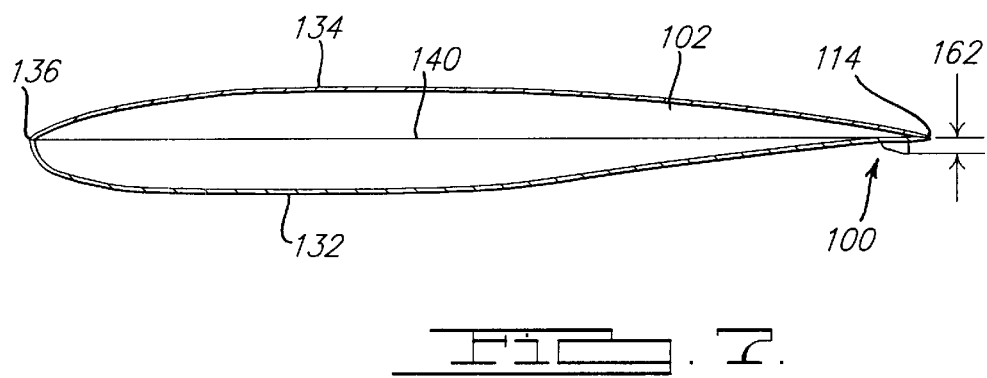
FIG. 7 is an airfoil sectional view taken along the line 7—7 of FIG. 6.

With reference to FIGS. 6 and 7, a systematic study of variations in the spanwise configuration of a baseline trailing edge wedge 100 was conducted to maximize the aerodynamic properties of a conventional wing 102, and more specifically to improve transonic wave drag and maximize both range and fuel burn. The wing 102 can be generally described as including a high pressure surface 132, a low pressure surface 134 that is disposed opposite the high pressure surface 132, a leading edge 136 that connects the high pressure and low pressure surfaces 132 and 134 on a forward side, and a trailing edge 114 that is connected to the high pressure and low pressure surfaces 132 and 134 on a rearward side that is opposite the leading edge 136. A chord 140 couples the leading edge 136 and the trailing edge 114. The wing 102 is illustrated to be segregated into three distinct zones: an inboard wing portion 144, a mid-span wing portion 146 and an outboard wing portion 148. The inboard wing portion 144 is configured to be coupled to an inboard side of a fuselage 150 and has a length of about 30% of the span of the wing 102. The inboard wing portion 144 is configured with a proximal end 152, which abuts the fuselage 50, and a distal end 154, which abuts a proximal end 156 of the mid-span wing portion 146. The mid-span wing portion 146 has a length of about 50% of the span of the wing 102 and is coupled at its distal end 158 to the proximal end 160 of the outboard wing portion 148.

The baseline trailing edge wedge 100 is installed at the trailing edge 114 of the wing 102 and is located forwardly of the trailing edge 114 by a distance 160 of 0.0% of the chord 140 to less than about 4.0% of the chord 140. The baseline trailing edge wedge 100 has a height 162 of about 0.4% of the chord 140 to about 0.8% of the chord 140 and a wedge angle of about 10° to about 45°. The wing 102 with the baseline trailing edge wedge 100 were segregated into a plurality of airfoil segments 118 that were optimized using the iterative process described above to develop an improved trailing edge wedge 170, which is illustrated in FIG. 8.

In the particular example provided, the improved trailing edge wedge 170 extends over only the mid-span wing portion 146 and the outboard wing portion 148. The portion of the improved trailing edge wedge 170 that is coupled to the mid-span wing portion 146 has a trailing edge base 138 with a trailing edge bluntness of about 0.5% of the chord 140, which is maintained over the length of the outboard wing portion 148. The size of the improved trailing edge wedge 170, however, decreases slightly toward the tip 176 of the outboard wing portion 148. As those skilled in the art will appreciate, further variations in the trailing edge bluntness and the size (e.g., height 162 and wedge angle) of the baseline trailing edge wedge 100 may also be studied to maximize the aerodynamic benefit.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An improved transonic wing, the wing having a chord and a span, the wing comprising:

an inboard wing portion that is configured to be coupled to an inboard side of a fuselage; and a mid-span wing portion that is coupled to a distal end of the inboard wing portion;

wherein each of the inboard wing portion and the mid-span wing portion includes a trailing edge base, a high pressure surface connected to the trailing edge base, a low pressure surface opposite the high pressure surface and connected to the trailing edge base and a leading edge connecting the high pressure and low pressure surfaces opposite the trailing edge base;

wherein at least a trailing portion of each of the high pressure and low pressure surfaces of the inboard wing portion are defined by slopes forming an included trailing edge angle that converges; and wherein at least a trailing portion of each of the high pressure and low pressure surfaces of the mid-span wing portion have slopes forming an included trailing edge angle that diverges.

2. The improved transonic wing of claim 1, wherein the slope of the trailing portion of each of the high pressure and low pressure surfaces of the mid-span wing portion is substantially constant in magnitude over a length of the mid-span wing portion.

3. The improved transonic wing of claim 1, wherein the trailing edge base of the inboard wing portion has a bluntness that tapers between a proximal end of the inboard wing portion and a distal end of the inboard wing portion.

4. The improved transonic wing of claim 3, wherein the proximal end of the inboard wing portion has a bluntness of about 0.1% of the chord.

5. The improved transonic wing of claim 3, wherein the distal end of the inboard wing portion has a bluntness of about 0.5% of the chord.

6. The improved transonic wing of claim 5, wherein the distal end of the inboard wing portion has an included trailing edge angle that is less than about −15°.

7. The improved transonic wing of claim 1, further comprising an outboard wing portion that is coupled to a distal end of the mid-span portion, the outboard wing portion including a trailing edge base, a high pressure surface connected to the trailing edge base of the outboard wing portion, a low pressure surface opposite the high pressure surface of the outboard wing portion and connected to the trailing edge base of the outboard wing portion and a leading edge connecting the high pressure and low pressure surfaces of the outboard wing portion opposite the trailing edge base of the outboard wing portion, a trailing portion of each of the high pressure and low pressure surfaces of the outboard wing portion have slopes forming an included trailing edge angle that diverges.

8. The improved transonic wing of claim 7, wherein the trailing edge base of the outboard wing portion has a bluntness that tapers between a proximal end of the outboard wing portion and a distal end of the outboard wing portion.

9. The improved transonic wing of claim 8, wherein the distal end of the outboard wing portion has a bluntness of about 0.3% of the chord.

10. The improved transonic wing of claim 8, wherein the distal end of the outboard wing portion has an included trailing edge angle of about −10°.

11. The improved transonic wing of claim 7, wherein the outboard wing portion constitutes about 20% of the span of the improved transonic wing.

12. The improved transonic wing of claim 11, wherein the inboard wing portion constitutes about 30% of the span of the improved transonic wing.

13. The improved transonic wing of claim 7, wherein the high pressure surface of the outboard wing portion includes a region of high local concentrated concave curvature immediately prior to the trailing edge base of the outboard wing portion.

14. The improved transonic wing of claim 1, wherein the high pressure surface of the mid-span wing portion includes a region of high local concentrated concave curvature immediately prior to the trailing edge base.

15. The improved transonic wing of claim 14, wherein the region of high local concentrated concave curvature in the mid-span wing portion is substantially constant in size over a length of the mid-span wing portion.

16. A method for forming a transonic wing having a chord and a span, the method comprising the steps of:
   a) providing a baseline transonic wing;
   b) segregating the baseline transonic wing into a plurality of airfoil segments, each of the airfoil segments being defined by a set of characteristics including trailing edge bluntness and trailing edge included angle;
   c) modifying at least one of the characteristics in the set of characteristics for at least one airfoil segment to provide a modified wing; and
   d) tailoring a spanwise variation of the baseline transonic wing to include a plurality of most favorable airfoil segment configurations that maximize the aerodynamic benefits over the wing.

17. The method of claim 16, wherein between the modifying and tailoring steps the method further comprises the step of assessing an aerodynamic characteristic of the at least one modified airfoil segment to determine a plurality of most favorable airfoil segment configurations that maximize the aerodynamic benefits over the wing.

18. An improved transonic wing having a chord and a span, the improved transonic wing comprising:
   a blunt trailing-edge base that varies spanwise;
   a high pressure surface connected to the blunt trailing-edge base by an immediate region of high local concentrated concave curvature;
   a low pressure surface, opposite the high pressure surface and coupled to the blunt trailing-edge base;
   wherein a trailing portion of each of the high pressure and low pressure surfaces have a slope, the slopes of the trailing portion of the high and low pressure surfaces forming an included trailing-edge angle which diverges in the chordwise direction over a spanwise range in a tailored manner to enhance aircraft performance; and
   a leading edge connecting said high pressure and low-pressure surfaces opposite said blunt trailing-edge base.

19. The improved transonic wing of claim 18, wherein the blunt trailing edge base includes at least one spanwise region having a sharp trailing edge.

20. The improved transonic wing of claim 19, wherein the blunt trailing edge base includes at least one spanwise region that lacks a sharp trailing edge.

21. The improved transonic wing of claim 18, wherein the blunt trailing edge base includes at least one spanwise region that lacks a sharp trailing edge.

22. The improved transonic wing of claim 18, wherein the slopes of the trailing portions of the high pressure and low pressure surfaces diverge chordwise from each other by an angle that is less than about 45 degrees over a spanwise region of the improved transonic wing having the blunt trailing edge base.

23. The improved transonic wing of claim 18, wherein the blunt trailing edge base is generally perpendicular to the chord.

24. The improved transonic wing of claim 23, wherein the blunt trailing edge base has a height between about 0.1% and about 1.0% of the chord and varies spanwise in a tailored manner.

25. The improved transonic wing of claim 18, wherein the region of high local concave curvature on the high pressure surface occurs within about a last 5% of the chord.

* * * * *